United States Patent Office 3,835,089
Patented Sept. 10, 1974

---

3,835,089
POLYLACTONE-MODIFIED LINEAR POLYESTERS AND MOLDING COMPOSITIONS CONTAINING THE SAME
Daniel W. Fox and Allen D. Wambach, Pittsfield, Mass., assignors to General Electric Company
No Drawing. Filed June 23, 1972, Ser. No. 265,672
Int. Cl. C08g 51/04
U.S. Cl. 260—40 R                                31 Claims

ABSTRACT OF THE DISCLOSURE

Thermoplastic compositions comprising (a) a poly(1,4-butylene terephthalate) resin and (b) a linear aliphatic polyester resin of the general formula

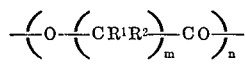

wherein $R^1$ and $R^2$ are hydrogen or alkyl, $m$ is 2–5 and $n$ is from 25 to 1500. The composition of resins (a) and (b) can be reinforced with fillers and/or rendered flame retardant.

---

The present invention is concerned with thermoplastic polyester compositions. More particularly, it relates to compositions of linear, partially aromatic and linear, wholly aliphatic polyesters, which provide advantages, both in terms of physical properties and economy in manufacture, over those obtainable with the individual polyester components.

BACKGROUND OF THE INVENTION

High molecular weight linear thermoplastic partially aromatic and partially aliphatic polyesters, such as poly (ethylene terephthalate) and poly(1,4-butylene terephthalate) are well known as film and fiber-formers and they are provided by methods outlined in Whinfield et al., U.S. 2,465,319, and Pengilly, U.S. 3,047,539, and elsewhere.

Poly(1,4-butylene terephthalate) resins are superior for many non-fiber uses because they crystallize very rapidly from the melt. They provide excellent molding compositions because they can be fabricated with moderate stock temperatures, low mold temperatures and rapid cycle times. Because of their highly crystalline nature, these resins are outstanding in chemical resistance, thermal stability and product appearance (they have a smooth, glossy finish). Such resins also have superior strength, stiffness, low friction and wear properties and good resistance to brittle fracture.

The poly(butylene terephthalate) resins can also be provided in reinforced and flame retardant embodiments.

The need exists, however, to provide the poly(butylene terephthalate) resin-containing compositions with improved toughness, e.g., as measured by resistance to fracture on impact, without at the same time causing substantial losses in other important properties, such as resistance to distortion by heat.

It has now been discovered that the addition of a minor proportion of a linear, wholly aliphatic polyester resin to a composition containing a major proportion of a partly aromatic, partly aliphatic linear polyester, e.g., poly(1,4-butylene terephthalate), will enhance both the notched Izod impact strength and the tensile impact strengths of the latter. The increase in toughness is both unexpected and significant in magnitude. Furthermore, there is no lowering of the heat distortion temperature and only small decreases in strength and modulus, so long as the maximum specified amount of linear aliphatic polyester resin component is not exceeded.

Molded parts containing the poly(butylene terephthalate) resin with a minor proportion of the linear, wholly aliphatic polyester resin, both unmodified, as well as reinforced, and also flame retardant embodiment, have excellent appearance, with no delamination between polymeric phases. The appearance of parts molded from the compositions containing up to about 40 parts by weight of linear, wholly aliphatic polyester per 60 parts of partly aliphatic, partly aromatic polyester, e.g., poly(1,4-butylene terephthalate), is indistinguishable from the excellent appearance of parts molded from compositions containing the latter only as the sole resinous component.

Minor amounts of other polyesters or copolyesters can be included in the compositions. For example, a small amount of poly(1,4-dimethylolcyclohexane terephthalate) can be present. Or small amounts of other aromatic dicarboxylic acids such as isophthalic acid and naphthalene dicarboxylic acid or aliphatic dicarboxylic acids, such as adipic acid may be substituted for the terephthalic acid components. Small amounts of other diols, such as propane diol, or 1,4-dimethylol cyclohexane can replace the aliphatic diols.

As will be explained hereinafter, however, none of these will be of the type employed as component (b); namely, a wholly aliphatic linear polyester of the general formula

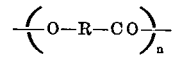

wherein R is a divalent alkylene and $n$ represents the average number of repeating units in the chain.

It is an object of this invention to improve the moldability and other properties of poly(1,4-butylene terephthalate) resins, providing compositions having many properties improved over those of compositions containing the said resin alone.

A further object is to provide such compositions in reinforced and/or flame retardant embodiments.

DESCRIPTION OF THE INVENTION

According to this invention there are provided thermoplastic compositions comprising:

(a) From about 99 to about 60 parts by weight of a poly-(1,4-butylene terephthalate) resin or a copolyester thereof with a minor amount of an aliphatic or aromatic dicarboxylic acid or an aliphatic polyol and (b) From about 1 to about 40 parts by weight of a linear aliphatic polyester resin of the formula

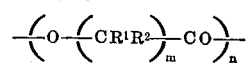

wherein $R^1$ and $R^2$ are selected from hydrogen, methyl or ethyl, $m$ is a whole number of from 2 to 5, and $n$ is a whole number of from about 25 to about 1500.

A preferred feature of this invention is to provide reinforcing thermoplastic compositions comprising the above-mentioned combination of polyester resin components (a) and (b) and a reinforcing amount of a reinforcing filler for said combination.

Still another preferred feature of this invention is to provide flame retardant thermoplastic compositions comprising the above-mentioned combination of polyester resin components (a) and (b) and a flame retardant additive in a minor proportion but in an amount at least sufficient to render resinous components (a) and (b) non-burning or self-extinguishing.

According to another preferred feature of this invention, there are provided reinforced flame retardant thermoplastic compositions comprising the above-mentioned combination of polyester resin components (a) and (b) and a reinforcing amount of a reinforcing filler for components (a) and (b) and a flame retardant additive in a minor proportion but in an amount at least sufficient to render resinous components (a) and (b) non-burning or self-extinguishing.

The present invention also contemplates compositions comprising the above-mentioned combination of polyester resin components (a) and (b) and from about 1 to 40 percent by weight of a high molecular weight normally crystalline linear polypropylene homopolymer or copolymer based on the combined weights of resinous components (a) and (b), as well as reinforced and/or flame-retardant embodiments thereof.

Preferred polyester resins for component (a) will be of the family consisting of high molecular weight, polymeric 1,4-butylene glycol terephthalates) having repeating units of the general formula

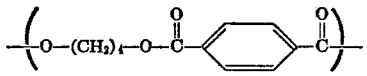

Also contemplated are mixtures of such esters with minor amount, e.g., from 0.5 to 2% by weight, of units derived from aliphatic or aromatic dicarboxylic acids and/or aliphatic polyols, e.g., glycols, i.e., copolyesters. These can also be made following the teachings of the Pengilly and Whinfield et al. patents, above-mentioned, suitably modified, if necessary. Poly(1,4-butylene terephthalate) is commercially available.

Especially preferred polyesters for use as component (a) are poly(1,4-butylene terephthalate) resins. Special mention is made of this polyester because it crystallizes at an especially rapid rate.

Among the units which can be present in the copolyesters are those derived from aliphatic dicarboxylic acids, e.g., of up to about 50 carbon atoms, including cycloaliphatic, straight and branched chain acids, such as adipic acid, cyclohexanediacetic acid, dimerized $C_{16}$–$C_{18}$ unsaturated acids (which have 32 to 36 carbon atoms), trimerized such acids, and the like. Among the units in the copolyesters can also be minor amounts derived from aromatic dicarboxylic acids, e.g., of up to about 36 carbon atoms, such as isophthalic acid and the like. In addition to the 1,4-butylene glycol units, there can also be minor amounts of units derived from other aliphatic glycols and polyols, e.g., of up to about 50 carbon atoms, including ethylene glycol, propylene glycol, glycerol, cyclohexanediol, and the like. Such copolyesters can be made by techniques well known to those skilled in the art.

Illustratively, sufficiently high molecular weight polyesters for component (a) will have an intrinsic viscosity of at least 0.2 and preferably about 0.4 deciliters/gram as measured in o-chlorophenol, a 60/40 phenol-tetrachloroethane mixture or a similar solvent at 25–30° C. The upper limit is not critical, but it will generally be about 2.5 dl./g. Especially preferred polyesters will have an intrinsic viscosity in the range of 0.5 to 1.3.

Preferred linear aliphatic resins for component (b) will be of the family having repeating units of the general formula

wherein R is divalent alkylene of, e.g., from 2 to 30 carbon atoms, straight chain and branched, and the number of repeating units is such that the average molecular weight is up to about 100,000.

More particularly, polyester component (b) will be of the general formula

wherein $R^1$ and $R^2$ are hydrogen or alkyl, e.g., methyl or ethyl, m is, for example, 2–5, and n is from about 25 to about 1500. Especially preferred compounds within this family will comprise those in which $R^1$ and $R^2$ are each hydrogen, or are methyl or ethyl on the carbon adjacent to the liking oxygen atom. The most preferred such polyesters are poly(beta-propiolacetone), poly(gamma - butyrolactone), poly(delta - valerolactone); poly(epsiloncaprolactone) or mixtures of at least two of them. The best balance of properties appears to result from the use of poly(epsilon-caprolactone) and this is preferred.

The polyester resin component (b) can be made in known ways. For example, by polymerizing the corresponding lactone:

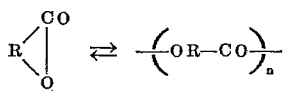

where R and n are as above defined. The reaction can be spontaneous or will proceed on heating, depending on the lactone, but it is best to use a catalyst or an initiator, e.g., cationic or anionic, organic tertiary bases, alkali and alkaline earth metals, hydrides, alkoxides, alkyls, a coordination compound, or a hydrogen donor, e.g., a carboxylic acid, alcohol, glycol, primary and secondary amine or an alkanol amine. Depending on the lactone, polymerization will occur at −20 to 200° C., in bulk or with melts or solutions of the monomer in an inert solvent. It is preferred to use well dried materials and highest molecular weights are obtained with carefully purified monomers, e.g., those distilled from isocyanates.

By way of illustration, epsilon-caprolactone, after purification by distillation from 2% toluene diisocyanate, is treated with 0.001 mole of acetyl perchlorate/mole of monomer and polymerizes in 68 hours to a 60% yield of high molecular weight poly(epsilon-caprolactone), intrinsic viscosity about 1.02 dl./g. (in benzene at 20° C., 10 g./l.). With an anionic initiator, aluminum triethyl, 0.01 mole/mole of monomer, purified epsilon-caprolactone polymerizes in 21 hours to a 72.5% yield of polymer, intrinsic viscosity, 0.675 dl./g. (in benzene at 20° C., 10 g./l.). Instead of acetyl perchlorate, other cationic initiators can comprise trifluoroacetic acid and trifluoroacetic anhydride/AlCl$_3$ (1:2). Instead of aluminum triethyl, other anionic initiators which can be used comprise metallic sodium, sodium-naphthalene, and the like.

Entirely analogous procedures can be used to polymerize the corresponding other lactones: beta-propiolactone, gamma-butyrolactone and delta-valerolactone.

Two other useful methods comprise heating a mixture of 675 parts of epsilon-caprolactone, 325 parts of mixed epsilon-methyl-epsilon-caprolactone, 29 parts of ethylene glycol and 0.5 parts of dibutyltin oxide at 170° C. for 17 hours under nitrogen. This produces a methyl substituted, unsubstituted copolyester or mixture. Alternatively, a mixture of 600 parts of epsilon-caprolactone, 33.4 parts of hexamethylene diamine and 0.3 parts of dibutyltin oxide can be heated at 170° C. under nitrogen for 24 hours. The products are recovered in known ways.

Further details on preparative procedures for polyester component (b) may be obtained by reference to The Encyclopedia of Polymer Science and Technology, Vol. 11, John Wiley and Sons, Inc., New York, 1969, p. 98–101; H. Cherdron et al., Makromol. Chem. 56, 179–186 and 187–194 (1962); U.S. 2,933,477 and U.S. 2,933,478.

Illustratively, sufficiently high molecular weights for the linear aliphatic polyester resin component (b) will be provided if the reduced viscosity is at least about 0.1 and preferably about 0.3, as measured in benzene at 2 g./l. at 30° C. The upper limit is not critical, but will generally be about 2.0. The preferred polyesters will have from about 100 to about 1000 average repeating units. For poly(epsilon-caprolactone), the most preferred reduced viscosity range will be about 0.3 to 0.7. However, especially preferred polymers will have about 300 to 400 repeating units in the average chain—for poly(epsilon-caprolactone), the corresponding reduced viscosity will range around 0.65–0.75, in benzene at 30° C.

Although the poly(1,4-butylene terephthalate) and/or copolyester resins and the linear aliphatic polyester resins are combinable with each other in all proportions, because major proportions of the latter cause adverse effects on heat distortions and stiffness, only compositions 99 to 60 parts by weight of the poly(1,4-butylene terephthalate) resin and from 1 to 40 parts by weight of the linear aliphatic polyester resin component are included within the scope of the invention. In general, however, compositions containing from about 75 to about 99, and especially from about 85 to about 99, parts by weight of poly(butylene terephthalate) resin and from about 25 to about 1, and especially from about 15 to about 1, parts by weight of the linear aliphatic polyester resin component exhibit the best overall combination of properties and these concentrations are preferred.

As has been mentioned, a preferred class of compositions will comprise the polyester components (a) and (b) and a reinforcing amount of a reinforcing filler. In general, any reinforcement can be used, e.g., fibers, whiskers or platelets of metals, e.g., aluminum, iron or nickel, and the like, and non-metals, e.g., ceramics, carbon filaments, silicates, asbestos, $TiO_2$ and titanate whiskers, quartz, glass flakes and fibers and the like. It is to be understood that, unless the filler adds to the strength, stiffness and impact strength of the composition, it is only a filler and not a reinforcing filler as contemplated herein.

Although it is only necessary to have at least a reinforcing amount of the reinforcement present, in general, the combination of polyester components (a) and (b) will comprise from about 1 to about 80 parts by weight of the total composition.

In particular, the preferred reinforcing fillers are of glass and it is preferred to use fibrous glass filaments comprised of lime-aluminum borosilicate glass that is relatively soda free. This is known as "E" glass. However, other glasses are useful where electrical properties are not so important, e.g., the low soda glass known as "C" glass. The filaments are made by standard processes, e.g., by steam or air blowing, flame blowing and mechanical pulling. The preferred filaments for plastics reinforcement are made by mechanical pulling. The filament diameters range from about 0.00012 to 0.00075 inch, but this is not critical to the present invention.

The length of the glass filaments and whether or not they are bundled into fibers and the fibers bundled in turn to yarns, ropes or rovings, or woven into mats, and the like, are also not critical to the invention. However, in preparing the present compositions, it is convenient to use the filamentous glass in the form of chopped strands of from about ⅛" to about 1" long, preferably less than ¼" long. In articles molded from the compositions, on the other hand, even shorter lengths will be encountered because, during compounding, considerable fragmentation will occur. This is desirable, however, because the best properties are exhibited by thermoplastic injection molded articles in which the filament lengths lie between about 0.000005" and 0.125 (⅛").

In general, best properties will be obtained if the sized filamentous glass reinforcement comprises from about 1 to about 80% by weight based on the combined weight of glass and polyesters and preferably from about 5 to about 50% by weight. Especially preferably the glass will comprise from about 10 to about 40% by weight based on the combined weight of glass and resins. Generally, for direct molding use, up to about 60% of glass can be present without causing flow problems. However, it is useful also to prepare the compositions containing substantially greater quantities, e.g., up to 70–80% by weight of glass. These concentrates can then be custom blended with blends of resins that are not glass reinforced to provide any desired glass content of a lower value.

Because it has been found that certain commonly used flammable sizings on the glass, e.g., dextrinized starch or synthetic polymers, contribute flammability often in greater proportion than expected from the amount present, it is preferred to use lightly sized or unsized glass reinforcements in those compositions of the present invention which are flame retardant. Sizings, if present, can readily be removed by heat cleaning or other techniques well known to those skilled in the art.

It is a preferred feature of this invention also to provide flame retardant glass reinforced thermoplastic compositions, as defined above, because the polyesters are normally flammable, the compositions also including a flame retardant additive in a minor proportion but in an amount at least sufficient to render the polyester resin non-burning or self-extinguishing.

Non-dripping embodiments are provided if the flame retardant compositions also include a polytetrafluoroethylene resin or a fumed colloidal silica in a minor proportion based on the composition but in an amount at least sufficient to render said polyester resin non-dripping, when burning.

When used herein, the terms "non-burning," "self-extinguishing" and "non-dripping" are used to describe compositions which meet the standards of ASTM test method D–635 and Underwriter's Laboratories Bulletin No. 94. Another recognized procedure to determine flame resistance of resinous compositions is the Oxygen Index Test or LOI (Limiting Oxygen Index). This test is a direct measure of a product's combustibility based on the oxygen content of the combustion atmosphere. Appropriate specimens are placed in a combustion chimney and the oxygen is reduced stepwise until the material no longer supports a flame. The LOI is defined as the percent oxygen times 100 divided by the sum of the percentages of nitrogen and oxygen in the gas used to burn the material under test. Further details of the Oxygen Index Test are found in ASTM test method D–2863. The compositions of this invention which contain flame-retardant additives in the specified amounts have a substantially higher oxygen index and thus are much less combustible than the controls.

The flame-retardant additives useful in this invention comprise a family of chemical compounds well known to those skilled in the art. Generally speaking, the more important of these compounds contain chemical elements employed for their ability to impart flame resistance, e.g., bromine, chlorine, antimony, phosphorus and nitrogen. It is preferred that the flame-retardant additive comprise a halogenated organic compound (brominated or chlorinated); a halogen-containing organic compound in admixture with an organic or inorganic antimony compound, e.g., antimony oxide; elemental phosphorus or a phosphorus compound; a halogen-containing compound in admixture with a phosphorus compound or compounds containing phosphorus-nitrogen bonds or a mixture of two or more of the foregoing.

The amount of flame-retardant additive used is not critical to the invention, so long as it is present in a minor proportion based on said composition—major proportions will detract from physical properties—but at least sufficient to render the polyester resin-blend non-burning or self-extinguishing. Those skilled in the art are well aware that the amount will vary with the nature of the polymers in the blend and with the efficiency of the additive. In general, however, the amount of additive will be from 0.5 to 50 parts by weight per hundred parts of components (a) plus (b). A preferred range will be from about 3 to 25 parts and an especially preferred range will be from about 5 to 15 parts of additive per 100 parts of (a) plus (b). Smaller amounts of compounds highly concentrated in the elements responsible for flame-retardance will be sufficient, e.g., elemental red phosphorus will be preferred at 0.5 to 10 parts by weight per hundred parts of (a) plus (b), while phosphorus in the form of triphenyl phosphate will be used at 5 to 25 parts of phosphate per part of (a) plus (b), and so forth. Halogenated aromatics will be used at 2 to 20 parts and synergists, e.g., inorganic or organic antimony compounds, such as antimony oxide, will be used at about 1 to 10 parts per 100 parts of components (a) plus (b).

Among the useful halogen-containing compounds are those of the formula

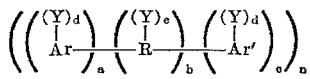

wherein $n$ is 1 to 10 and R is an alkylene, alkylidene or cycloaliphatic linkage, e.g., methylene, ethylene, propylene, isopropylene, isopropylidene, butylene, isobutylene, amylene, cyclohexylene, cyclopentylidene, and the like; a linkage selected from the group consisting of ether; carbonyl; a sulfur-containing linkage, e.g., sulfide, sulfoxide, sulfone, carbonate; a phosphorus-containing linkage; and the like. R can also consist of two or more alkylene or alkylidene linkages connected by such groups as aromatic, ether, ester, carbonyl, sulfide, sulfoxide, sulfone, a phosphorus-containing linkage, and the like. R can be a dihydric phenol, e.g., bisphenol-A, carbonate linkage. Other groups which are represented by R will occur to those skilled in the art.

Ar and Ar' are mono- or polycarbocyclic aromatic groups such as phenylene, biphenylene, terphenylene, naphthylene, and the like. Ar and Ar' may be the same or different.

Y is a substituent selected from the group consisting of organic, inorganic or organometallic radicals. The substituents represented by Y include (1) halogen, e.g., chlorine, bromine, iodine, or fluorine or (2) ether groups of the general formula OE, wherein E is a monovalent hydrocarbon radical similar to X or (3) monovalent hydrocarbon groups of the type represented by R or (4) other substituents, e.g., nitro, cyano, etc., said substituents being essentially inert provided there be at least one and preferably two halogen atoms per aryl, e.g., phenyl, nucleus.

X is a monovalent hydrocarbon group exemplified by the following: alkyl, such as methyl, ethyl, propyl, isopropyl, butyl, decyl, and the like; aryl groups, such as phenyl, naphthyl, biphenyl, xylyl, tolyl, and the like; aralkyl groups, such as benzyl, ethylphenyl, and the like; cycloaliphatic groups, such as cyclopentyl, cyclohexyl, and the like; as well as monovalent hydrocarbon groups containing inert substituents therein. It will be understood that where more than one X is used they may be alike or different.

The letter $d$ represents a whole number ranging from 1 to a maximum equivalent to the number of replaceable hydrogens substituted on the aromatic rings comprising Ar or Ar'. The letter $e$ represents a whole number ranging from 0 to a maximum controlled by the number of replaceable hydrogens on R. The letters $a$, $b$, and $c$ represent whole numbers including 0. When $b$ is not 0, neither $a$ nor $c$ may be 0. Otherwise either $a$ or $c$, but not both, may be 0. Where $b$ is 0, the aromatic groups are joined by a direct carbon-to-carbon bond.

The hydroxyl and Y substituents on the aromatic groups, Ar and Ar' can be varied in the ortho, meta or para positions on the aromatic rings and the groups can be in any possible geometric relationship with respect to one another.

Included within the scope of the above formula are diaromatics of which the following are representative:

2,2-bis(3,5-dichlorophenyl)propane
bis(2-chlorophenyl)methane
bis(2,6-dibromophenyl)methane
1,1-bis(4-iodophenyl)ethane
1,2-bis(2,6-dichlorophenyl)ethane
1,1-bis(2-chloro-4-iodophenyl)ethane
1,1-bis(2-chloro-4-methylphenyl)ethane
1,1-bis(3,5-dichlorophenyl)ethane
2,2-bis(3-phenyl-4-bromophenyl)ethane
2,3-bis(4,6-dichloronaphthyl)propane 2,2-bis(2,6-dichlorophenyl)pentane
2,2-bis(3,5-dichlorophenyl)hexane
bis(4-chlorophenyl)phenylmethane
bis(3,5-dichlorophenyl)cyclohexylmethane
bis(3-nitro-4-bromophenyl)methane
bis(4-hydroxy-2,6-dichloro-3-methoxyphenyl)methane
2,2-bis(3,5-dichloro-4-hydroxyphenyl)propane
2,2-bis(3-bromo-4-hydroxyphenyl)propane.

The preparation of these and other applicable biphenyls are known in the art. In place of the divalent aliphatic group in the above examples may be substituted sulfide, sulfoxy and the like.

Included within the above structural formula are substituted benzenes exemplified by tetrabromobenzene, hexachlorobenzene, hexabromobenzene, and biphenyls such as 2,2'-dichlorobiphenyl, 2,4'-dibromobiphenyl, 2,4'-dichlorobiphenyl, hexabromobiphenyl, octabromobiphenyl, decabromobiphenyl and halogenated diphenyl ethers, containing 2 to 10 halogen atoms.

The preferred halogen compounds for this invention are aromatic halogen compounds such as chlorinated benzene, brominated benzene, chlorinated biphenyl, chlorinated terphenyl, brominated biphenyl, brominated terphenyl or a compound comprising two phenyl radicals separated by a divalent alkenyl group and having at least two chlorine or bromine atoms per phenyl nucleus, and mixtures of at least two of the foregoing.

Especially preferred are hexabromobenzene and brominated or chlorinated biphenyls or terphenyls, alone, or mixed with antimony oxide.

In general, the preferred phosphate compounds are selected from elemental phosphorus or organic phosphonic acids, phosphonates, phosphinates, phosphonites, phosphinites, phosphene oxides, phosphenes, phosphites or phosphates. Illustrative is triphenyl phosphine oxide. These can be used alone or mixed with hexabromobenzene or a chlorinated biphenyl and, optionally, antimony oxide.

Typical of the preferred phosphorus compounds to be employed in this invention would be those having the general formula

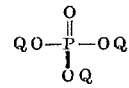

and nitrogen analogs thereof where each Q represents the same or different radicals including hydrocarbon radicals such as alkyl, cycloalkyl, aryl, alkyl substituted aryl and aryl substituted alkyl; halogen; hydrogen and combinations thereof provided that at least one of said Q's is aryl. Typical examples of suitable phosphates include, phenylbisdodecyl phosphate, phenylbisneopentyl phosphate, phenylethylene hydrogen phosphate, phenylbis(3,5,5'-trimethylhexyl phosphate), ethyldiphenyl phosphate, 2-ethylhexyl di(p-tolyl) phosphate, diphenyl hydrogen phosphate, bis(2-ethylhexyl) p-tolylphosphate, tritolyl phosphate, bis(2-ethylhexyl)-phenyl phosphate, tri(nonylphenyl)phosphate, phenylmethyl hydrogen phosphate, di(dodecyl) p-tolyl phosphate, tricresyl phosphate, triphenyl phosphate, halogenated triphenyl phosphate, dibutylphenyl phosphate, 2-chloroethyldiphenyl phosphate, p-tolyl bis(2,5,5'-trimethylhexyl)phosphate, 2-ethylhexyldiphenyl phosphate, diphenyl hydrogen phosphate, and the like. The preferred phosphates are those where each Q is aryl. The most preferred phosphate is triphenyl phosphate. It is also preferred to use triphenyl phosphate in combination with hexabromobenzene and, optionally, antimony oxide.

Also suitable as flame-retardant additives for this invention are compounds containing phosphorus-nitrogen bonds, such as phosphonitrilic chloride, phosphorus ester amides, phosphoric acid amides, phosphonic acid amides, phosphinic acid amides, tris(aziridinyl)phosphine oxide or tetrakis(hydroxymethyl)phosphonium chloride. These flame-retardant additives are commercially available.

Particularly preferred flame retardant additives for use in this invention are low molecular weight polymers of a carbonate of a halogenated dihydric phenol. Preferred such polymers contain from 2 to 10 repeating units of the formula

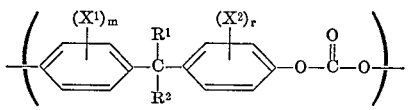

wherein $R^1$ and $R^2$ are hydrogen, (lower)alkyl or phenyl, $X^1$ and $X^2$ are bromo or chloro and $m$ and $r$ are from 1 to 4. The polymeric additives will have a low volatility when heated above 200° C., and a softening point of less than about 300° C. They will be used alone or in combination with synergists, such as inorganic or organic antimony-containing compounds.

These polymeric additives can be made by polymerizing a mixture of a halogenated dihydric phenol and a chain stopper, e.g., an alcohol, carboxylic acid, carboxylic acid halide or, preferably a monohydric phenol, and most preferably a halogenated phenol and phosgene or a reactive derivative thereof in the presence of an acid acceptor, e.g., an amine or caustic. Details concerning the preparation and use of such compounds are given in the copending patent application of Daniel W. Fox, "Flame Retardant Compounds and Thermoplastic Compositions Containing the Same" Ser. No. 194,518, filed on or about Nov. 1, 1971, and incorporated herein by reference.

The most preferred such additive can be made by polymerizing a mixture of tetrabromobisphenol-A and 2,4,6-tribromophenol with phosgene in either methylene chloride or in methylene chloride containing triethylamine in admixture with an aqueous caustic phase. The product of such a process will be a polymer of the formula:

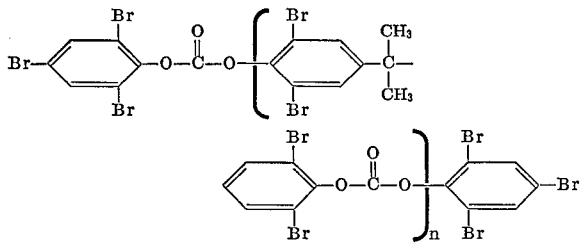

wherein the average number of repeating units, $n$, will be from about 3 to about 7, and the softening point will be in the range of from 200 to 260° C.

The preferred polymeric additives can be used within the concentration ranges specified above for halogenated compounds in general, but preferably will be used in amounts of from about 5 to about 25 parts by weight per 100 parts by weight of the flammable resinous components in the composition, e.g., components (a) and (b), and also any normally flammable co-blending resin, e.g., polypropylene, as the case may be.

The polytetrafluoroethylene resins used in the compositions of this invention to retard dripping of flamming resin are commercially available or can be prepared by known processes. They are white solids obtained by free radical initiated polymerization of tetrafluoroethylene in aqueous media with free radical catalysts, e.g., sodium, potassium, or ammonium peroxydisulfates at 100 to 1000 p.s.i. at 0–200° C., and preferably at 20–100° C. See Brubaker, U.S. 2,393,967. While not essential, it is preferred to use the resins in the form of relatively large particles, e.g., of average size 0.3 to 0.7 mm., mostly 0.5 mm. These are better than the usual polytetrafluoroethylene powders which have particles of from 0.05 to 0.5 millimicrons in diameter. It is especially preferred to use the relatively large particle size material because it tends to disperse readily in polymers and bond them together into fibrous networks. Such preferred polyethylenes are designated by ASTM as Type 3, and are available commercially from the Du Pont Company (Teflon Type 6) for general use in the extrusion of thin-walled tubular goods and tape.

The amount of polytetrafluoroethylene to be used can vary widely, from an amount of at least sufficient to render the polyester non-dripping (when burning) but usually will be from about 0.1 to about 10 parts and preferably from about 0.5 to about 2.5 parts by weight per hundred parts by weight of the combination of components (a) plus (b), and also any normally flammable co-blending resin, e.g., polypropylene, as the case may be.

The fumed colloidal silica employed in the non-dripping embodiments is preferably a finely powdered form. A silica which is particularly preferred is commercially available as Cab-O-Sil EH–5 from the Cabot Corporation. Cab-O-Sil EH–5 is a submicroscopic fumed silica having on a dry basis 99% silicon dioxide. It has a surface area of 390±40 m.²/gm. (BET), a nominal particle size of 0.007 micron, a maximum density of 2.3 lbs./cu. ft., an ignition loss of 2.5% (1000° C. on a moisture free basis) and a pH of 3.5–4.2 (4% aqueous dispersion). The fumed colloidal silica may be employed at a range of 0.25 to 4 parts by weight per 100 parts by weight of components (a) plus (b). However, a particularly preferred range is 0.5 to 2.5 parts by weight. Within this particularly preferred range it has been found advantageous to employ in most compositions about 1.25 parts by weight per 100 parts by weight of components (a) plus (b); and also any normally flammable co-blending resins, e.g., polypropylene, as the case may be.

The method of blending the compositions of this invention is not critical and can be carried out by conventional techniques. One convenient method comprises blending the polyesters in powder or granular form, extruding the blend and comminuting into pellets or other suitable shapes.

The reinforcements and other additives are added in any usual manner, e.g., by dry mixing or by mixing in the melted state in an extruder, on a heated mill or in other mixers.

By way of illustration, glass roving (a bundle of strands of filaments) is chopped into small pieces, e.g., ⅛″ to 1″ in length, and preferably less than ¼″ in length and put into an extrusion compounder with the polyester resins, and, if used, the co-blending polymer, the flame retardant additive(s) and polytetrafluoroethylene or fumed colloidal silica to produce molding pellets. The fibers are shortened and predispersed in the process, coming out at less than ⅟₁₆″ long. In another procedure, glass filaments are ground or milled to short lengths, and are mixed with the polyester resins, and, optionally, co-blending polymer, flame retardant additive and polytetrafluoroethylene resin or fumed colloidal silica, by dry blending then either fluxed on a mill and ground, or they are extruded and chopped. In still another procedure continuous lengths of glass roving are drawn through a bath of melted polyester resins, and, optinally, the co-blending, second polymer, the flame retardant additive(s) and polytetrafluoroethylene resin, or fumed colloidal silica, e.g., in an extruder, which procedure coats the filaments, and then the resin-coated glass strand is comminuted into pellets to form a molding compound. The glass fibers can also be mixed with resin and additives and directly molded, e.g., by injection or transfer molding techniques.

It is always very important to thoroughly free all of the ingredients, the polyester resin(s), co-blending polymer, reinforcing filler, and flame retardant additives, from as much water as possible.

In addition, compounding should be carried out to insure that the residence time in the machine is short; the temperature is carefully controlled; the frictional heat is utilized; and an intimate blend between the resin and the additives is obtained.

Although it is not essential, best results are obtained if the ingredients are precompounded, pelletized and then molded. Precompounding can be carried out in conventional equipment. For example, after carefully pre-drying the polyester resins, the co-blending polymer and other additives, and the reinforcement, e.g., under vacuum at 100° C. for 12 hours, a single screw extruder is fed with a dry blend of the ingredients, the screw employed having a long transition section to insure proper melting. On the other hand, a twin extrusion machine, e.g., a 28 mm. Werner Pfleiderer machine can be fed with resins and additives at the feed port and reinforcement down stream. In either case, a generally suitable machine temperature will be about 300 to 600° F.

The precompounded composition can be extruded and cut up into molding compounds, such as conventional granules, pellets, etc., by standard techniques.

The compositions can be molded in any equipment conventionally used for reinforced thermoplastic compositions. For example, good results will be obtained in an injection molding machine, e.g., of the Newbury type, with conventional cylinder temperatures, e.g., 500° F. and conventional mold temperatures, e.g., 150° F. If necessary, depending on the molding properties of the co-blending polymer, the amount of reinforcing filler and the rate of crystallization of the polyester component, those skilled in the art will be able to make the conversional adjustments in molding cycles to accommodate the composition.

DESCRIPTION OF THE PREFERRED EMBODIMENTS

The following examples illustrate the invention. They are set forth as a further description, but are not to be construed as limiting the invention thereto.

EXAMPLE 1

The following ingredients are dried:

poly(1,4-butylene terephthalate), intrinsic viscosity, 1.15 dl./g.; melting point, 225° C.; and
poly(epsilon-caprolactone), intrinsic viscosity, about 0.7 dl./g.; molecular weight about 40,000.

The dry blends are precompounded at 450° F. in a 1-inch diameter extruder having a screw compression ratio of 3 to 1 and a length to diameter ratio of 20 to 1. The extrudate is pelletized. For comparative purposes pelletized poly(1,4-butylene terephthalate) is also provided. The pellets are injection molded at 480° F. (mold, 150° F.) into ASTM type test bars in a 3 oz. Newbury machine. The test bars are tested for the following physical properties: Tensile strength and elongation, ASTM D–1708; Flexural strength and modulus, ASTM D–790; Izod Impact strength, ASTM D–256; Tensile Impact strength, ASTM D–1822; and Heat distortion temperature, ASTM D–648. The formulations used and the results obtained are set out in Table 1:

TABLE 1

[Physical properties of composition of poly(1,4-butylene terephthalate) and poly(epsilon caprolactone)]

| Example | 1A* | |
|---|---|---|
| Ingredients (parts by weight): | | |
| Poly(1,4-butylene terephthalate) | 100 | 90 |
| Poly(epsilon caprolactone) | 0 | 10 |
| Properties: | | |
| Heat distortion temp., ° F.: | | |
| At 264 p.s.i. | 127 | 127 |
| At 66 p.s.i. | 280 | 284 |
| Flexural strength, p.s.i. | 10,780 | 9,380 |
| Flexural modulus, p.s.i. | 315,000 | 281,000 |
| Tensile strength, p.s.i. | 7,030 | 5,860 |
| Elongation, percent | 330 | 200 |
| Notched Izod impact strength, ft.-lbs./in. | 0.7 | 0.8 |
| Tensile impact strength, ft.-lbs./in.² | 31 | 42 |

*Control.

Example 1A is a control of unaltered poly(1,4-butylene terephthalate) resin. Example 1 is a direct comparison in that 10% by weight of poly(caprolactone) is included. Toughness is increased (notched Izod and tensile impact) and there is no decrease in the heat distortion temperature.

EXAMPLES 2 AND 3

The following ingredients are dried:

poly(1,4-butylene terephthalate), as in Example 1;
poly(epsilon caprolactone), as in Example 1; and
fibrous glass reinforcement, ⅛″.

The compositions are extruded and molded by the procedure of Example 1 and the properties obtained are set out in Table 2:

TABLE 2

[Physical properties of reinforced compositions of poly(1,4-butylene terephthalate) and poly(epsilon caprolactone)]

| Examples | 2A* | 2 | 3A* | 3 |
|---|---|---|---|---|
| Ingredients (parts by weight): | | | | |
| Poly(1,4-butylene terephthalate) | 95 | 85.6 | 70 | 63 |
| Poly(epsilon-caprolactone) | | 9.5 | | 7 |
| Fibrous glass reinforcement | 5 | 4.9 | 30 | 30 |
| Properties: | | | | |
| Heat distortion temp., °F.: | | | | |
| At 264 p.s.i. (⅛″) | 354 | **N.D. | 405 | 399 |
| At 66 p.s.i. | N.D. | 386 | 435 | N.D. |
| Flexural strength, p.s.i. | 16,200 | 10,000 | 29,500 | 23,020 |
| Flexural modulus, p.s.i. | 346,000 | 346,000 | 1,310,000 | 857,000 |
| Tensile strength, p.s.i. | 10,000 | 7,230 | 17,300 | 14,130 |
| Elongation, percent | 6.3 | 23.9 | 5.0 | 7.3 |
| Notched Izod impact strength, ft.-lbs./in. | 0.6 | 1.0 | 2.0 | 3.0 |
| Tensile impact strength, ft.-lbs./in.² | N.D. | 34 | 70 | N.D. |

*Control. **N.D.=not determined.

The effect of fibrous glass reinforcement in enhancing heat distortion resistance and stiffness is seen by comparison with the un-reinforced compositions of Example 1. The addition of poly(caprolactone), Example 2, gives a notched Izod impact strength higher than the unreinforced control (Ex. 1A) whereas with reinforcement, the control (2A) has a lower Izod impact strength. It is noteworthy that the notched Izod impact strength of Example 3 is 50% greater than that of its control (3A) even though heat distortion temperature is not significantly affected.

EXAMPLE 4

In an extruder are blended 63 parts by weight of poly(1,4-butylene terephthalate), 7 parts by weight of poly(epsilon caprolactone); 30 parts by weight of ⅛″ fibrous glass reinforcement, 17.2 parts per hundred of resin of poly(2,2 - bis(3,5-dibromo-4-hydroxyphenyl)propane carbonate) terminated with tribromophenoxy groups (having about 5 repeating units and prepared by reacting 0.05 moles of tetrabromobisphenol-A, 0.02 moles of tribromophenol and phosgene in methylene chloride and pyridine), and 4.3 parts per hundred of resin of antimony oxide. The composition is injection molded into test pieces which are self-extinguishing within 5 seconds after two 10-second ignitions by an open flame, with no flaming dripping and a maximum of 10 sec. after glowing (SE-), Underwriter's Bulletin 94 flame test) and the Oxygen Index is 29% (ASTM D–2863). There is no observable plate-out or volatilization of the additive components during processing. A glass reinforced flame retardant composition according to this invention is obtained.

EXAMPLE 5

In an extruder are blended 63 parts by weight of poly(1,4-butylene terephthalate), 7 parts by weight of poly(epsilon caprolactone), 30 parts by weight of ⅛″ fibrous glass reinforcement, 7 parts by weight of hexabromobenzene, 3 parts by weight of antimony oxide and 1.5 parts by weight of finely divided polytetrafluoroethylene resin, average particle size, 0.3–0.7 mm. The composition is injection molded into test pieces which are flame-retardant and do not drip, while burning.

The procedures of Examples 4 and 5 can be repeated using the following formulations:

| Ingredients: | Parts by weight |
|---|---|
| Poly(1,4-butylene terephthalate) | 99 |
| Poly(epsilon caprolactone) | 1 |
| Poly(2,2-bis(3,5-dibromo-4-hydroxyphenyl) propane carbonate) terminated with tribromophenoxy groups | 17.2 |
| Poly(1,4-butylene terephthalate) | 85 |
| Poly(epsilon caprolactone) | 15 |
| Fibrous glass reinforcement | 30 |
| Hexabromobenzene | 7 |
| Antimony oxide | 3 |
| Triphenyl phosphine oxide | 3 |
| Poly(1,4-butylene terephthalate) | 75 |
| Poly(epsilon caprolactone) | 25 |
| Hexachlorobiphenyl | 10 |
| Triphenyl antimony | 5 |
| Poly(1,4-butylene terephthalate) | 63 |
| Poly(epsilon caprolactone) | 7 |
| Fibrous glass reinforcement | 30 |
| Hexabromobenzene | 7 |
| Antimony oxide | 3 |
| Fumed colloidal silica | 1 |

Flame retardant unreinforced and reinforced compositions according to this invention are obtained. Fumed colloidal silica prevents dripping, while burning.

EXAMPLE 6

The following ingredients are dried:

poly(1,4-butylene terephthalate), as in Example 1;
poly(epsilon caprolactone), is in Example 1;
fibrous glass reinforcement, 1/8"; and
crystalline linear polypropylene, sp. gr., 0.90, crystalline m.p.~180° C.

The compositions are extruded and molded by the procedure of Example 1 and the properties obtained are set out in Table 3.

TABLE 3

[Physical properties of reinforced compositions of poly(1,4-butylene terephthalate), poly(epsilon caprolactone) and polypropylene]

| Example | 6A* | 6 |
|---|---|---|
| Ingredients (parts by weight): | | |
| Poly (1,4—butylene terephthalate) | 56 | 57.1 |
| Poly(epsilon caprolactone) | | 7.2 |
| Polypropylene | 14 | 14.3 |
| Fibrous glass reinforcement | 30 | 21.4 |
| Properties: | | |
| Heat distortion temp., °F.: | | |
| At 264 p.s.i. (1/8") | 392 | **N.D. |
| At 66 p.s.i. | 425 | 430 |
| Flexural strength, p.s.i. | 22,000 | 15,210 |
| Flexural modulus, p.s.i. | 1,070,000 | 617,000 |
| Tensile strength, p.s.i. | 14,600 | 9,960 |
| Elongation, percent | 5.0 | 4.8 |
| Notched Izod impact strength, ft.-lbs./in. | 2.2 | 2.3 |
| Tensile impact, strength, ft.-lbs./in.² | 43 | 5.1 |

*Control. **N.D.=not determined.

Control Example 6A is the poly(1,4-butylene terephthalate) with 30% by weight of glass. Addition of polycaprolactone in place of 30% of the glass filament content provides a Izod impact strength of slightly better level without any effect on the heat distortion temperature (Example 6).

EXAMPLE 7

In an extruder are blended 50 parts by weight of poly (1,4-butylene terephthalate), 10 parts by weight of poly-(epsilon caprolactone), 20 parts by weight of polypropylene, 20 parts by weight of fibrous glass reinforcement, 17.2 parts per hundred of resin of poly(2,2-bis(3,5-dibromo-4-hydroxyphenyl) propane carbonate) terminated with tribromophenoxy units (having about 5 repeating units), and 4.3 parts per hundred of resin of antimony oxide. The composition is injection molded into test pieces which are self-extinguishing and the Oxygen Index is high.

There is no observable plate-out or volatilization of the components after processing.

Other modifications of the above examples provide compositions within the scope of this invention.

For example, for poly(1,4-butylene terephthalate), substitute a 98/2 1,4-butylene terephthalate-1,4-butylene adipate copolyester or a 98/2 1,4-butylene terephthalate-glycerol terephthalate copolyester.

For poly(epsilon caprolactone), substitute poly(epsilon-methyl-epsilon caprolactone), poly(beta-propiolactone): poly(gamma-butyrolactone): and poly(delta-valerolactone).

For polypropylene, substitute a propylene copolymer having a polypropylene backbone and ethylene terminal blocks, nominal 7.5% ethylene.

Compositions according to the present invention are also obtained by modifying the above example.

For the glass fibers, the following reinforcing fillers can be substituted: aluminum powder; asbestos fibers; silicate; bronze powder; ceramic fibers; titanate fibers; quartz and carbon black.

Because of their excellent physical, mechanical, chemical, electrical and thermal properties and the enhanced flame resistance of certain embodiments, the polyester compositions of this invention have many and varied uses. The compositions may be used alone as molding powders or mixed with other polymers and may contain additional, non-reinforcing fillers, such as wood flour, cloth fibers, clays and the like, as well as pigments and dyes, stabilizers, plasticizers, and the like.

Obviously, other modifications and variations of the present invention are possible in the light of the above teachings. It is, therefore, to be understood that changes may be made in the particular embodiments of this invention described which are within the full intended scope of the invention as defined by the appended claims.

We claim:
1. A thermoplastic composition comprising
   (a) from about 99 to about 60 parts by weight of a poly-(1,4-butylene terephthalate) resin or a copolyester thereof with a minor amount of an aliphatic or aromatic dicarboxylic acid or an aliphatic polyol and
   (b) from about 1 to about 40 parts by weight of a linear aliphatic polyester resin of the formula

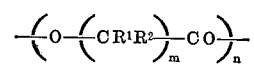

wherein $R^1$ and $R^2$ are selected from hydrogen, methyl or ethyl, $m$ is a whole number of from 2 to 5, and $n$ is a whole number of from about 25 to about 1500.

2. A composition is defined in Claim 1 wherein component (a) comprises from about 75 to about 99 parts by weight and component (b) comprises from about 25 to about 1 parts by weight.

3. A composition as defined in Claim 1 wherein component (a) comprises from about 85 to about 99 parts by weight and component (b) comprises from about 15 to about 1 parts by weight.

4. A composition as defined in Claim 1 wherein component (a) is a poly(1,4-butylene terephthalate) resin.

5. A composition as defined in Claim 1 wherein linear aliphatic polyester resin component (b) is poly(beta-propiolactone), poly(gamma-butyrolactone), poly(delta-valerolactone), poly(epsilon-caprolactone) or a mixture of at least two of the foregoing.

6. A composition as defined in Claim 1 wherein linear aliphatic resin component (b) is poly(epsilon-caprolactone).

7. A composition as defined in Claim 6 wherein, in said poly(epsilon-caprolactone), the average number of repeating units, $n$, is from about 100 to about 1000.

8. A composition as defined in Claim 7 wherein, in said poly(epsilon-caprolactone), the average number of repeating units, $n$, is from about 300 to about 400.

9. A composition as defined in Claim 1 which also includes a reinforcing amount of a reinforcing filler for said composition.

10. A composition as defined in Claim 9 wherein the reinforcing filler comprises from about 1 to about 80 percent by weight based on the combined weights of components (a) and (b) and the filler.

11. A composition as defined in Claim 9 wherein the reinforcing filler is selected from the group consisting of reinforcing metals, ceramics, silicates, quartz, glass and carbons.

12. A composition as defined in Claim 11 wherein said reinforcing filler is filamentous glass, in an amount of from about 1 to about 80 percent by weight based on the combined weight of components (a) and (b) and the glass.

13. A composition as defined in Claim 9 wherein component (a) comprises from about 75 to about 99 parts by weight and component (b) comprises from about 25 to about 1 parts by weight of the total resinous components.

14. A composition as defined in Claim 9 wherein component (a) comprises from about 85 to about 99 parts by weight and component (b) comprises from about 15 to about 1 parts by weight of the total resinous components.

15. A composition as defined in Claim 9 wherein component (a) is a poly(1,4-butylene terephthalate) resin and component (b) is a poly(epsilon-caprolactone) resin.

16. A composition as defined in Claim 1 which also includes a flame retardant additive in a minor proportion but in an amount at least sufficient to render the resinous components (a) and (b) non-burning or self-extinguishing.

17. A composition as defined in Claim 16, the composition also including a polytetrafluoroethylene resin or a fumed colloidal silica in a minor proportion based on said composition but in an amount at least sufficient to render said resinous components (a) and (b) non-dripping, when burning.

18. A composition as defined in Claim 16 wherein said flame retardant additive is a halogen-containing compound, a halogen-containing compound in admixture with an antimony compound; elemental phosphorus or a phosphorus compound, a halogen-containing compound in admixture with a phosphorus compound; a compound containing phosphorus-nitrogen bonds; or a mixture of the foregoing, and said compound is present in an amount of 0.5 to 50 parts by weight per hundred parts of combined resinous components (a) and (b).

19. A composition as defined in Claim 16 wherein component (a) comprises from about 75 to about 99 parts by weight and component (b) comprises from about 25 to about 1 parts by weight of the total resinous components.

20. A flame composition as defined in Claim 16 wherein component (a) comprises from about 85 to about 99 parts by weight and component (b) comprises from about 15 to about 1 parts by weight of the total resinous components.

21. A composition as defined in Claim 16 wherein component (a) is a poly(1,4-butylene terephthalate) resin and component (b) is a poly(epsilon-caprolactone) resin.

22. A thermoplastic composition as defined in Claim 1 which also includes a reinforcing amount of a reinforcing filler for resinous components (a) and (b) and a flame retardant additive in a minor proportion but in an amount at least sufficient to render resinous components (a) and (b) non-burning or self-extinguishing.

23. A composition as defined in Claim 22 wherein component (a) comprises from about 75 to about 99 parts by weight and component (b) comprises from about 25 to about 1 parts by weight of the total resinous components.

24. A composition as defined in Claim 22 wherein component (a) comprises from about 85 to about 99 parts by weight and component (b) comprises from about 15 to about 1 parts by weight of the total resinous components.

25. A reinforced flame retardant composition as defined in Claim 22 wherein component (a) is a poly(1,4-butylene terephthalate) resin and component (b) is a poly(epsilon-caprolactone) resin.

26. A composition as defined in Claim 1 which also includes from about 1 to about 40 percent by weight of a high molecular weight normally crystalline linear polypropylene homopolymer or copolymer based on the combined weight of resinous components (a) and (b).

27. A composition as defined in Claim 26 which also includes a reinforcing amount of a reinforcing filler for said composition.

28. A composition as defined in Claim 27 wherein the resin-forcing filler is filamentous glass, in an amount of from about 1 to about 80 percent by weight based on the combined weights of components (a) and (b), the polypropylene homopolymer or copolymer and the glass.

29. A composition as defined in Claim 26 which also includes a flame retardant additive in a minor proportion but in an amount at least sufficient to render the resinous components (a) and (b) and the polypropylene homopolymer or copolymer non-burning or self-extinguishing.

30. A composition as defined in Claim 26 which also includes a reinforcing amount of a reinforcing filler for said composition and a flame retardant additive in a minor proportion but in an amount at least sufficient to render the resinous components (a) and (b) and the polypropylene homopolymer or copolymer non-burning or self-extinguishing.

31. A method for increasing the toughness, without lowering the heat distortion temperature, of a thermoplastic composition comprising a poly-(1,4-butylene terephthalate) resin or a copolyester thereof with a minor amount of an aliphatic or aromatic dicarboxylic acid or an aliphatic polyol, said method comprising adding to from 99 to 60 parts by weight of said composition, from about 1 to about 40 parts by weight of a linear aliphatic polyester resin of the formula

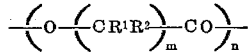

wherein $R^1$ and $R^2$ are selected from hydrogen, methyl or ethyl, $m$ is a whole number of from 2 to 5, and $n$ is a whole number of from about 25 to about 1500.

References Cited

UNITED STATES PATENTS

| | | | |
|---|---|---|---|
| 3,671,487 | 6/1972 | Abolins | 260—40 R |
| 3,169,945 | 2/1965 | Hostettler et al. | 260—78.3 R |
| 3,549,586 | 12/1970 | Smith et al. | 260—40 R |
| 3,699,070 | 10/1972 | Wynstra et al. | 260—31.4 EP |
| 3,504,080 | 3/1970 | Siggel et al. | 260—873 X |
| 3,624,024 | 11/1971 | Caldwell et al. | 260—40 R |

MORRIS LIEBMAN, Primary Examiner

S. M. PERSON, Assistant Examiner

U.S. Cl. X.R.

260—860, 873